United States Patent
Buvat et al.

(10) Patent No.: US 9,184,459 B2
(45) Date of Patent: Nov. 10, 2015

(54) SULFONATED POLYMERS USEFUL FOR FORMING FUEL CELL MEMBRANES

(75) Inventors: Pierrick Buvat, Montbazon (FR); Jannick Bigarre, Tours (FR); Renaud Perrin, Tours (FR); Bruno Ameduri, Montpellier (FR); Aurelien Soules, Capestang (FR); Bernard Boutevin, Montpellier (FR)

(73) Assignees: COMMISSARIAT A L'ENERGIE ATOMIQUE ET AUX ENERGIES ALTERNATIVES, Paris (FR); CENTRE NATIONAL DE LA RECHERCHE SCIENTIFIQUE, Paris (FR); UNIVERSITE MONTPELLIER 2, SCIENCES ET TECHNIQUES, Montpellier (FR); ECOLE NATIONALE SUPERIEURE DE CHIMIE DE MONTPELLIER, Montpellier (FR)

( * ) Notice: Subject to any disclaimer, the term of this patent is extended or adjusted under 35 U.S.C. 154(b) by 323 days.

(21) Appl. No.: 13/823,991

(22) PCT Filed: Sep. 21, 2011

(86) PCT No.: PCT/EP2011/066402
§ 371 (c)(1),
(2), (4) Date: Mar. 15, 2013

(87) PCT Pub. No.: WO2012/038465
PCT Pub. Date: Mar. 29, 2012

(65) Prior Publication Data
US 2013/0196250 A1 Aug. 1, 2013

(30) Foreign Application Priority Data
Sep. 23, 2010 (FR) .................. 10 57668

(51) Int. Cl.
| | | |
|---|---|---|
| *H01M 8/10* | (2006.01) | |
| *C08F 8/36* | (2006.01) | |
| *C08J 3/24* | (2006.01) | |
| *C08J 5/22* | (2006.01) | |
| *C08F 8/30* | (2006.01) | |
| *C08F 112/08* | (2006.01) | |
| *C08F 112/14* | (2006.01) | |
| *C08F 12/08* | (2006.01) | |
| *C08F 12/30* | (2006.01) | |
| *C08F 293/00* | (2006.01) | |
| *H01M 8/02* | (2006.01) | |

(52) U.S. Cl.
CPC ............... *H01M 8/1039* (2013.01); *C08F 8/30* (2013.01); *C08F 8/36* (2013.01); *C08F 12/08* (2013.01); *C08F 12/30* (2013.01); *C08F 112/08* (2013.01); *C08F 112/14* (2013.01); *C08F 293/005* (2013.01); *C08J 3/24* (2013.01); *C08J 3/246* (2013.01); *C08J 5/2237* (2013.01); *H01M 8/0291* (2013.01); *H01M 8/1018* (2013.01); *H01M 8/1023* (2013.01); *C08F 2438/00* (2013.01); *C08F 2810/40* (2013.01); *C08J 2353/00* (2013.01); *Y02E 60/521* (2013.01)

(58) Field of Classification Search
CPC ............. C08F 8/30; C08F 8/36; C08F 12/08; C08F 12/30; C08F 112/08; C08F 112/14; C08J 3/24; C08J 3/246; C08J 5/2237; H01M 8/0291; H01M 8/1023; H01M 8/1039; H01M 8/102; H01M 8/103; H01M 8/1032; H01M 8/1018
USPC ............ 525/89, 95, 96, 241, 376, 344, 333.3, 525/333.5, 333.6; 521/27, 32, 33; 429/492, 429/493, 494

See application file for complete search history.

(56) References Cited

U.S. PATENT DOCUMENTS

| | | | | |
|---|---|---|---|---|
| 4,158,678 | A * | 6/1979 | Tatemoto et al. ............ | 522/141 |
| 2012/0136077 | A1 | 5/2012 | Soules et al. | |
| 2012/0219878 | A1 | 8/2012 | Tayouo et al. | |

FOREIGN PATENT DOCUMENTS

EP 1126537 A1 8/2001

OTHER PUBLICATIONS

Unpublished U.S. Appl. No. 13/811,027, filed Jan. 18, 2013.
Unpublished U.S. Appl. No. 13/878,578, filed Apr. 10, 2013.

* cited by examiner

*Primary Examiner* — Roberto Rabago
(74) *Attorney, Agent, or Firm* — Hultquist, PLLC; Mary B. Grant

(57) ABSTRACT

The invention relates to a polymer comprising at least one polymeric chain of a first type, the said chain comprising at least two blocks, the same or different, the said blocks comprising repeat units derived from the polymerisation of styrene monomers, the said units comprising at least one phenyl pendant group carrying at least one —$SO_3R$ group, R possibly being a hydrogen atom, an alkyl group or cationic counter-ion, the said two blocks being separated by a spacer group, the spacer group is a perfluorocarbon group.

28 Claims, No Drawings

SULFONATED POLYMERS USEFUL FOR FORMING FUEL CELL MEMBRANES

TECHNICAL FIELD

The present invention relates to original sulfonated polymers comprising, inter alia, styrene blocks between which a perfluorocarbon repeat unit is intercalated, and the method for preparing same.

These copolymers having excellent physicochemical capacities, in particular high ion exchange capacity and thermal stability properties, find particular application in the preparation of ion exchange membranes intended for fuel cells, in particular fuel cells having an electrolyte as membrane such as PEMFC cells (Proton Exchange Membrane Fuel Cells) and DMFCs (Direct Methanol Fuel Cells).

STATE OF THE PRIOR ART

A fuel cell conventionally comprises a stack of elementary cells inside which an electrochemical reaction occurs between two reagents which are continuously added. The fuel, such as hydrogen for fuel cells functioning with hydrogen/oxygen mixtures (PEMFC), or methanol for fuel cells functioning with methanol/oxygen mixtures (DMFC), is brought into contact with the anode whereas the oxidizer, generally oxygen, is brought into contact with the cathode. The anode and cathode are separated by an electrolyte, of ion exchange membrane type. The electrochemical reaction whose energy is converted to electrical energy divides into two semi-reactions:
  oxidation of the fuel, taking place at the anode/electrolyte interface which, for hydrogen fuel cells, produces H$^+$ protons which pass through the electrolyte in the direction of the cathode, and electrons which meet up with the external circuit, to contribute towards producing electrical energy;
  reduction of the oxidizer taking place at the electrolyte/cathode interface with the production of water in hydrogen fuel cells.

The electrochemical reaction takes place at an electrode-membrane-electrode assembly.

The electrode-membrane-electrode assembly is a very thin assembly whose thickness is of the order of one millimetre, and each electrode is supplied with fuel and oxidizer gases via a splined plate called a bipolar plate.

The ion conducting membrane is generally an organic membrane comprising ionic groups which, in the presence of water, allow the conducting of the protons produced at the anode by oxidation of the hydrogen.

The most frequently used commercially available membranes at the present time are membranes marketed under the trade names Nafion®, Flemion®, 3M®, Fumion® and Hyflon Ion® produced on industrial scale.

The authors of the present invention propose novel polymers able to be used as fuel cell membrane, having both high ion exchange capacity and high thermal stability, these polymers being structurally different from those existing in the prior art.

DESCRIPTION OF THE INVENTION

A first subject of the invention is therefore a polymer comprising at least one polymeric chain of a first type, said chain comprising at least two blocks, the same or different, said blocks comprising repeat units derived from the polymerisation of styrene monomers, said units comprising at least one phenyl pendant group carrying at least one —SO$_3$R group, R possibly being a hydrogen atom, an alkyl group or cationic counter-ion, said two blocks being separated by a spacer group, said spacer group being a perfluorocarbon group.

Said polymer has the following advantages:
  major ion exchange capacity which can be accounted for by the accessibility of the —SO$_3$R groups arranged on the phenyl pendant groups on the chain;
  major chemical and physical inertia due to the presence of perfluorocarbon spacer groups.

Before going into more detail in this description, the following definitions are specified.

By block in the meaning of the invention is conventionally meant part of the polymer formed of a chain of repeat units derived from polymerisation of styrene monomers such as defined above.

By alkyl group is conventionally meant in the foregoing and in the remainder hereof a straight-chain or branched alkyl group possibly having 1 to 20 carbon atoms, or cyclic possibly having 3 to 20 carbon atoms. As examples mention can be made of methyl, ethyl, n-propyl, i-propyl, n-butyl, n-dodecanyl, i-butyl, t-butyl, cyclopropyl, cyclohexyl groups.

By cationic counter-ion is conventionally meant a cation capable of neutralising the negative charge carried by the —SO$_3^-$ group, this cationic counter-ion able to chosen from among the cations derived from alkaline elements, ammonium cations.

By perfluorocarbon group is conventionally meant in the foregoing and in the remainder hereof a group comprising both carbon atoms and fluorine atoms (this perfluorocarbon group, compared with a hydrocarbon group, being a group in which all the hydrogen atoms are replaced by fluorine atoms), this perfluorocarbon group in the invention forming a bridge between two blocks derived from the polymerisation of styrene monomers. For example, it may be a perfluoroalkylene group comprising 1 to 30 carbon atoms for example, such as a —C$_6$F$_{12}$— group.

According to the invention, the polymers comprise at least two blocks, each of said blocks comprising repeat units derived from the polymerisation of styrene monomers, said units comprising at least one phenyl pendant group carrying at least one —SO$_3$R group, R being such as defined above.

These repeat units may meet the following general formula (I):

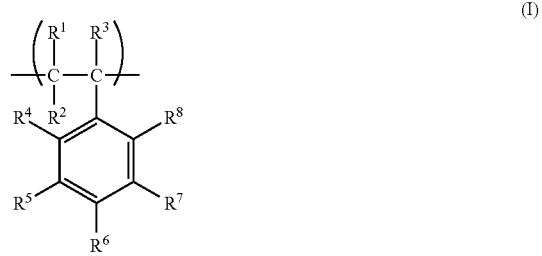

where R$^1$, R$^2$, R$^3$ independently of each other represent a hydrogen atom, an alkyl group, a halogen atom and R$^4$, R$^5$, R$^6$, R$^7$ and R$^8$ independently of each other represent a hydrogen atom, an alkyl group, an aryl group, a —O-aryl group, a —O-alkyl group, an acyl group, an alkylaryl group, a halogen atom, a —SO$_3$R group, R being such as defined above, the said alkyl, aryl, alkylaryl, —O-aryl, —O-alkyl groups optionally being perfluorinated and at least one of groups R$^4$, R$^5$, R$^6$, R$^7$ or R$^8$ being a —SO$_3$R group with R being such as defined above.

By aryl group is generally meant in the foregoing and in the remainder hereof an aryl group possibly comprising 6 to 20 carbon atom. As examples mention can be made of the benzyl, naphtyl, biphenyl groups.

By alkylaryl group is generally meant in the foregoing and in the remainder hereof an aryl group of same definition as given above, the said group being substituted by at least one alkyl group of same definition as given above.

By —O-alkyl, —O-aryl group is conventionally meant an alkyl group or aryl group meeting the same definition as given above, the alkyl or aryl group in this case being linked to the phenyl group of the repeat unit of formula (I) via an oxygen atom.

By perfluorinated is conventionally meant a group of which all the hydrogen atoms are substituted by fluorine atoms.

By acyl group is conventionally meant a —CO-alkyl group, the alkyl group meeting the same definition as given above, this alkyl group being linked to the phenyl group of the repeat unit of formula (I) via a —CO— group.

According to one particular embodiment of the invention, $R^1$ to $R^3$ represent a hydrogen atom and one of $R^4$, $R^5$, $R^6$, $R^7$ or $R^8$ represent a —$SO_3R$ group where R is such as defined above, whilst the other groups represent a hydrogen atom, a repeat unit meeting this definition and which may meet the following formula (Ia):

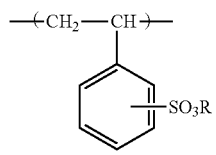

(Ia)

which means that the —$SO_3R$ group substitutes one of the hydrogen atoms of the phenyl group.

According to the invention, the said at least two blocks are separated by a spacer group (namely an organic group forming a bridge between the two blocks), this spacer group being a perfluorocarbon group, this perfluorocarbon group possibly being a perfluoroalkylene group meeting following formula (II):

(II)

n corresponding to the number of repeats of the unit between brackets, this number possibly being an integer possibly ranging from 1 to 30 carbon atoms. In particular, n may equal 6.

For example according to one particular embodiment of the invention, the polymers of the invention may comprise a chain of the first type comprising two blocks containing above-mentioned repeat units of formula (I), the said blocks being separated by a perfluorocarbon spacer group meeting above-mentioned formula (II), the assembly formed by these two blocks and the perfluorocarbon spacer group possibly meeting following formula (III):

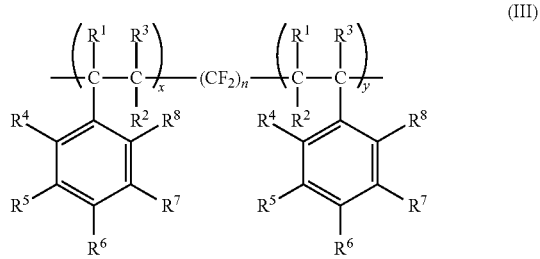

(III)

where x and y correspond to the number of repeats of the unit between brackets, whilst $R^1$ to $R^8$ and n are such as defined above.

The polymers of the invention may be straight-chain polymers comprising a polymeric chain of the first above-mentioned type.

In particular, the polymers of the invention may be straight-chain polymers comprising two blocks containing repeat units derived from the polymerisation of styrene monomers, the said units comprising at least one phenyl pendant group carrying at least one —$SO_3R$ group, R being such as defined above, said blocks being separated by a perfluorocarbon spacer group, said polymers at their ends comprising terminal groups (namely groups positioned at the ends of the polymer, these ends being the ends of the above-mentioned blocks not linked to the perfluorocarbon spacer group) which may be an iodine atom or an —$N_3$ azido group.

The said repeat units may be units of above-mentioned formula (I), whilst the perfluorocarbon group may be a group of above-mentioned formula (II).

An example of a polymer conforming to the definition given above may be a polymer meeting formula (IV), whose ends are occupied by an iodine atom or azido group, the polymer possibly being represented by following formula (IV):

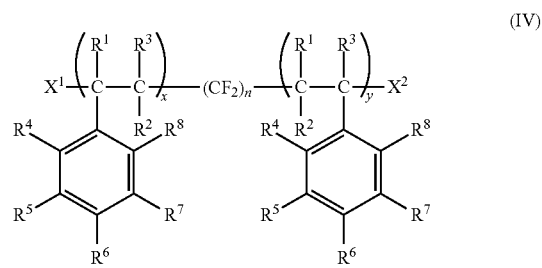

(IV)

where $X^2$ and $X^2$ independently of each other represent an iodine atom or $N_3$ azido group, $R^1$ to $R^8$, x, y and n being such as defined above.

One specific straight-chain polymer may be a polymer formed of two blocks comprising repeat units of above-mentioned formula (I), in which $R^1$ to $R^3$ are hydrogen atoms and one of $R^4$ to $R^8$ is a —$SO_3R$ group (with R being such as defined above) whilst the other groups are hydrogen atoms, the said two blocks being separated by a spacer group of above-mentioned formula (II) in which n is 6, the said polymer comprising terminal groups of iodo or azido type. More specifically, this polymer may meet above-mentioned formula (IV) in which $R^1$ to $R^3$ are hydrogen atoms, one of $R^4$ to $R^8$ is a —$SO_3R$ group (with R being such as defined above and in particular it is a hydrogen atom) whilst the other groups are hydrogen atoms and n is 6.

The polymers of the invention, when they are straight-chain, may have a molar mass ranging from 15000 to 60000 g/mol and a poly-molecularity index ranging from 1.4 to 1.8.

According to the invention, the polymers of the invention may also be cross-linked polymers, which in other words means that they may comprise one or more polymeric chains of the above-mentioned first type and one or more polymeric chains of a second type different from the above-mentioned first type, the said chains being linked together by cross-linking repeat units, which may be azido repeat units of formula $N_3$.

According to one particular embodiment, the polymers of the invention when they are cross-linked and in addition to one or more of the above-mentioned polymeric chains of the first type, may comprise one or more polymeric chains of a second type different from the above-mentioned first type, the said chains of second type possibly and particularly comprising at least two blocks the same or different comprising repeat units derived from the polymerisation of aliphatic ethylenic monomers, the said blocks being separated by a perfluorocarbon spacer group, the said chains being linked together by cross-linking repeat units e.g. of azido type.

The repeat units derived from the polymerisation of aliphatic ethylenic monomers may meet following formula (VI):

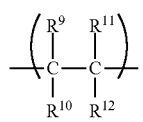

(VI)

where $R^9$, $R^{10}$, $R^{11}$ and $R^{12}$ independently of each other represent a hydrogen atom, an alkyl group, an aryl group, a —O-aryl group, a —O-alkyl group, an acyl group, an alkylaryl group, a halogen atom, whilst the perfluorocarbon spacer group may meet following formula (VII):

—(CF$_2$)$_m$— (VII)

where m corresponds to the number of repeats of the unit between brackets, m being an integer possibly ranging from 1 to 30.

In particular, the groups $R^9$ to $R^{12}$ may represent a hydrogen atom.

In particular, m may be 6.

According to one particular embodiment, the polymers of the invention, when they are cross-linked polymers, may comprise a chain of the second type comprising two blocks containing repeat units meeting above-mentioned formula (VI), the said blocks being separated by a perfluorocarbon spacer group of above-mentioned formula (VII), the assembly formed by these two blocks and the spacer group possibly meeting following formula (VIII):

(VIII)

where $R^9$ to $R^{12}$ are such as defined above, m, v and w correspond to the number of repeats of the unit between brackets.

In particular, $R^9$ to $R^{12}$ may correspond to a hydrogen atom, v and w may equal 1, whilst m may equal 6.

The cross-linking repeat units may be cross-linking units of azido type, which means that the different chains are linked at their ends via an azido repeat unit.

For example, when a polymer of the invention comprises chains of the first type meeting above-mentioned formula (III) and chains of the second type meeting above-mentioned formula (VIII), these chains may therefore be linked together via azido repeat units to form a network of following formula (IX):

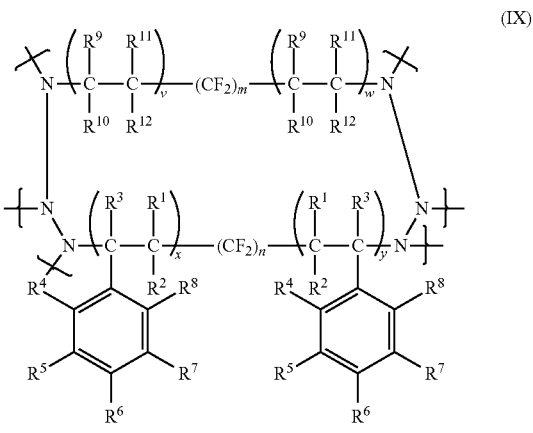

(IX)

where $R^1$ to $R^{12}$, x, y, v, w, n and m, are such as defined above, the braces interrupting the bonds starting from the nitrogen atoms indicate the points at which these nitrogen atoms are linked to one end of another chain of the first type or another chain of the second type.

In particular, $R^1$ to $R^3$ may be a hydrogen atom, one of $R^4$ to $R^8$ in each of the units between brackets may represent a SO$_3$R group (with R being such as defined above), the other groups being a hydrogen atom, $R^9$ to $R^{12}$ may be hydrogen atoms, n and m equal 6 and v and w equal 1.

Particular cross-linked polymers conforming to the invention may be polymers comprising one or more chains of the aforementioned first type comprising at least two blocks formed of repeat units meeting above-mentioned formula (I) in which $R^1$ to $R^3$ are hydrogen atoms and one of groups $R^4$ to $R^8$ is a —SO$_3$H group whilst the other groups are hydrogen atoms, the said blocks being separated by a perfluorocarbon spacer group of above-mentioned formula (II) with n equaling 6, and comprising one or more chains of the above-mentioned second type comprising at least two blocks formed by repeat units of above-mentioned formula (VI) in which $R^9$ to $R^{12}$ represent hydrogen atoms, the said blocks being separated by a spacer group of above-mentioned formula (VII) with m being 6, the said chains being linked together by cross-linking repeat units e.g. of azido type (which means that cross-linking repeat units will covalently bind the ends of the chains to each other—whether they are chains of the first type or of the second type).

The polymers of the invention can be prepared following different methods involving one or more polymerisation steps.

In particular, the polymers of the invention—which comprise at least one polymeric chain of a first type comprising at least two blocks, the same or different, the said blocks comprising repeat units derived from the polymerisation of styrene monomers, the said units comprising at least one phenyl pendant group carrying at least one —SO$_3$R group, R possibly being a hydrogen atom, an alkyl group or a cationic counter-ion, the said two blocks being separated by a spacer group, this spacer group being a perfluorocarbon group—can be prepared using a method comprising the following steps:

a) a polymerisation step of at least one styrene monomer by degenerative transfer of iodine, comprising the contacting of a transfer agent containing a perfluorocarbon group such as mentioned above having an iodine atom at its two ends, with a polymerisation initiator and at least one styrene monomer, after which a polymer is obtained comprising two blocks comprising repeat units derived from polymerisation of the said styrene monomer(s), the said blocks being separated by a perfluorocarbon spacer group corresponding to the perfluorocarbon group of the transfer agent, the said polymer comprising an iodine atom at its ends;

b) an optional substitution step of the iodine atoms positioned at the ends of the polymer obtained after step a), by —$N_3$ azido groups; and c) an optional sulfonation step of the polymer obtained at step a) or b) if the styrene monomer is devoid of any —$SO_3R$ group, R being such as defined above.

Without being bound by any theory, the method of the invention can be explained by the following reaction scheme using, as an example of styrene monomer, the styrene:

—$N_3$ azido groups, provided in this latter case that a substitution reaction is performed of the iodine atoms by azido groups.

As mentioned above, the transfer agent comprises a perfluorocarbon group (intended to find itself inserted between the two blocks of the polymers of the invention) such as mentioned above, comprising an iodine atom at its two ends, this transfer agent possibly meeting the following formula:

$$I—R_f—I$$

where $R_f$ corresponds to the above-mentioned perfluorocarbon group.

In particular, $R_f$ may correspond to a group of formula —$(CF_2)_n$—, with n being such as defined above, n possibly equaling 6, in which case the transfer agent corresponds to 1,6-diiodoperfluorohexane of formula I—$C_6F_{12}$—I.

The polymerization initiator can be chosen from among nitrile compounds such as AiBN (abbreviation for azo-bis-isobutyronitrile) or peroxide compounds, such as benzoyl peroxide, tertiobutyl peroxide, tertioamyl peroxide.

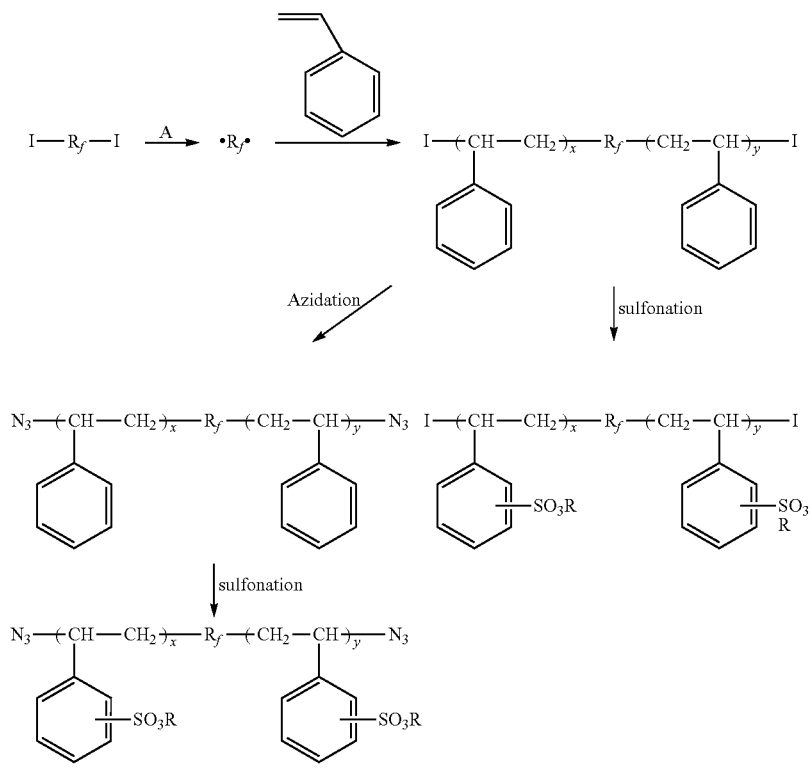

$R_f$ corresponding to the perfluorocarbon group such as mentioned above, x and y corresponding to the number of repeats of the unit between brackets, R being such as defined above, and A corresponding to the polymerization initiator.

As follows from this reaction scheme, the degenerative transfer agent of iodine I—$R_f$—I forms a biradical °$R_f$° which will generate polymerisation of the styrene either side of the $R_f$ group, so that after the polymerisation step two polystyrene blocks are obtained separated by a perfluorocarbon group $R_f$.

It is in this manner that it is possible to prepare straight-chain polymers conforming to the invention and such as defined above, having as terminal groups iodine atoms or The styrene monomers may meet following formula (X):

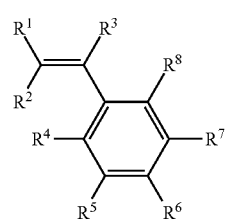

(X)

where $R^1$, $R^2$, $R^3$ independently of each other represent a hydrogen atom, an alkyl group, a halogen atom and $R^4$, $R^5$, $R^6$, $R^7$ and $R^8$ independently of each other represent a hydrogen atom, an alkyl group, an aryl group, a —O-aryl group, a —O-alkyl group, an acyl group, an alkylaryl group, a halogen atom, a —SO$_3$R group, R being such as defined above, the said alkyl, aryl, alkylaryl, —O-aryl, —O-alkyl groups optionally being perfluorinated.

When none of the groups $R^4$, $R^5$, $R^6$, $R^7$ and $R^8$ corresponds to an —SO$_3$R group such as mentioned above, the method of the invention comprises a sulfonation step (step c) mentioned above), this sulfonation step consisting of adding an —SO$_3$R group onto at least one of the carbon atoms of the phenyl group. In practice, this step may consist of subjecting the polymer obtained after the polymerisation step to the action of chlorosulfonic acid optionally in solution in an organic solvent, such as a halogen solvent (e.g. 1,2-dichloroethane).

If it is desired to obtain straight-chain polymers such as defined above comprising azido-type groups as terminal groups, the method of the invention may, after the polymerisation step and before the optional sulfonation step, comprise a nucleophilic substitution step of the iodine atoms by azido groups, this nucleophilic substitution step possibly consisting of subjecting the polymer obtained after the polymerisation step to the action of sodium azide.

If the polymers of the invention are cross-linked polymers—which, in addition to one or more chains of the above-mentioned first type, comprise one or more chains of a second type different from the above-mentioned first type, the said chains of the second type possibly comprising at least two blocks, the same or different, the said blocks comprising repeat units derived from the polymerisation of aliphatic ethylenic monomers, the said blocks being separated by a perfluorocarbon spacer group, the said chains being linked by cross-linking repeat units of azido type—the method for preparing such polymers may comprise the following steps:

d) a step to prepare a telechelic polymer precursor of said chains of the second type, the said telechelic polymer comprising at least two blocks, the same or different, the said blocks possibly comprising repeat units derived from polymerisation of aliphatic ethylenic monomers such as mentioned above, these blocks being separated by a perfluorocarbon spacer group, the ends of this telechelic polymer being formed by an azido group;

e) a step to prepare a polymer comprising at least one polymeric chain of a first type comprising at least two blocks, the same or different, the said blocks comprising repeat units derived from polymerisation of styrene monomers, the said units comprising at least one phenyl pendant group carrying at least one —SO$_3$R group, R possibly being a hydrogen atom, an alkyl group or a cationic counter-ion, the said two blocks being separated by a spacer group, the said spacer group being a perfluorocarbon group, the said preparation step comprising the following successive operations:

a polymerisation operation of at least one styrene monomer by degenerative transfer of iodine, comprising the contacting of a transfer agent comprising a perfluorocarbon group such as mentioned above having an iodine atom at its two ends, with a polymerisation initiator and at least one styrene monomer, after which a polymer is obtained comprising two blocks including repeat units derived from polymerisation of the said styrene monomer(s), the said blocks being separated by a perfluorocarbon spacer group corresponding to the perfluorocarbon group of the transfer agent, the said polymer comprising an iodine atom at its ends;

a substitution operation of the iodine atoms positioned at the ends of the polymer obtained after the preceding polymerisation operation, by —N$_3$ azido groups; and f) a cross-linking step of the polymer obtained after step e) such as defined above in the presence of the telechelic polymer obtained after step d) such as defined above;

g) an optional sulfonation step of the polymer obtained at above-mentioned step f) if the styrene monomer(s) mentioned at step e) do not comprise any —SO$_3$R groups with R being such as defined above.

The polymerisation operation of step e) and the substitution operation of step e) are similar to the above-mentioned steps a) and b).

During the cross-linking step of the polymer obtained after step e) in the presence of the above-mentioned telechelic polymer, the azido groups carried by the telechelic polymer will react with the azido groups positioned at the ends of the polymer obtained after step e), after which azido bridges will be formed between the chains of the first type and the chains of the second type.

This cross-linking step can be performed by subjecting the mixture of polymer derived from step e) and telechelic polymer derived from step d) (this mixture possibly being formed as a film) to ultraviolet radiation.

The above-mentioned telechelic polymer may comprise two blocks, the same or different, comprising repeat units derived from polymerisation of aliphatic ethylenic monomers, the said units possibly meeting following formula (VI):

(VI)

where $R^9$, $R^{10}$, $R^{11}$ and $R^{12}$ independently of each other represent a hydrogen atom, an alkyl group, an aryl group, a —O-aryl group, a —O-alkyl group, an acyl group, an alkylaryl group, a halogen atom, whilst the perfluorocarbon spacer group separating the said blocks may meet above-mentioned formula (VII).

The preparation step of the telechelic polymer may comprise the following operations:

a polymerisation operation of at least one monomer, whose polymerisation is intended to form the repeat units of the constituent blocks of the chains of second type, these monomers possibly being aliphatic ethylenic monomers, in the presence of a transfer agent formed by a diiodine compound comprising iodine atoms at its two ends separated by a perfluorocarbon spacer group such as defined above, and in the presence of a polymerisation initiator, after which a polymer is obtained comprising two blocks derived from the polymerisation of the said above-mentioned monomer(s), these blocks being separated by said perfluorocarbon spacer group corresponding to the perfluorocarbon spacer group of the above-mentioned transfer agent, and the said polymer comprising two iodine atoms at its ends;

a substitution operation of the iodine atoms at the ends of the polymer by —N$_3$ azido groups.

The monomer may be an aliphatic ethylenic monomer meeting following formula (XI):

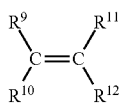

(XI)

where $R^9$, $R^{10}$, $R^{11}$ and $R^{12}$ independently of each other represent a hydrogen atom, an alkyl group, an aryl group, a —O-aryl group, a —O-alkyl group, an acyl group, an alkylaryl group, a halogen atom.

The transfer agent may meet the following formula:

where $R_f$ corresponds to the above-mentioned perfluorocarbon group, this group possibly corresponding to above-mentioned formula (VII) with m possibly being 6, after which it corresponds to 1,6-diiodoperfluorohexane of formula I—$C_6F_{12}$—I.

Therefore, when the aliphatic ethylenic monomer meets the above-mentioned specific formula and the transfer agent meets the above-mentioned specific formula, the preparation step of the telechelic polymer can be summarized by the following reaction scheme:

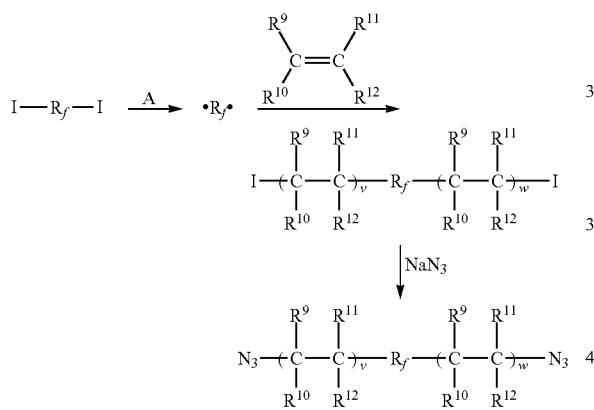

$R_f$ corresponding to the perfluorocarbon group such as mentioned above, v and w corresponding to the number of repeats of the unit between brackets and A corresponding to the polymerization initiator.

The nucleophilic substitution step can be performed in similar manner to the one set forth above.

The sulfonation step can also be performed in similar manner to the one set forth above.

Irrespective of the embodiment, when R represents a halogen atom or an alkyl group, the method of the invention may further comprise an acid hydrolysis step allowing transformation of the R groups to a hydrogen atom.

The method of the invention, on completion thereof, may also comprise a step to isolate the polymer from the reaction medium, this isolating step possibly entailing the addition to the reaction medium of a precipitation solvent such as cold pentane followed by filtering of the precipitate obtained.

The polymers of the invention, as previously mentioned, have the particularity that they display good chemical and mechanical stability as well as good proton conductivity.

On this account, a further subject of the present invention is a membrane comprising at least one polymer such as described above, this membrane possibly being a proton conducting membrane in particular.

The membranes can be prepared conventionally, for example by solution casting i.e. the polymer is placed in solution in a suitable solvent such as acetone then applied to a planar surface such as a glass plate, using a device such as a manual applicator.

The polymer forming a wet film is then dried to form a film of adequate thickness e.g. 15 to 150 μm, then lifted off the substrate.

Such membranes, in particular when R represents a hydrogen atom, have very high ion exchange capacity ranging for example from 1 to 3.5 meq.g$^{-1}$. On this account, these membranes can particularly be used to insulate the anode and cathode compartments of a fuel cell which may use the following operating systems:

hydrogen, alcohols e.g. methanol at the anode;
oxygen, air at the cathode.

Therefore, a further subject of the present invention is a fuel cell device comprising at least one cell having a membrane such as defined above arranged between two electrodes.

To prepare said device, the membrane is placed between two electrodes e.g. in carbon fabric optionally platinum-coated and impregnated for example with a copolymer according to the invention. The assembly is pressed by heating.

This assembly is then inserted between two plates (e.g. in graphite called bipolar plates) which ensure distribution of the gases and electrical conductivity).

The invention will now be described with reference to the following examples given for illustration purposes but which are non-limiting.

DETAILED DESCRIPTION OF PARTICULAR EMBODIMENTS

Example 1

This example illustrates the preparation of a film in sulfonated polymer conforming to the invention, this film being prepared as per the following reaction scheme:

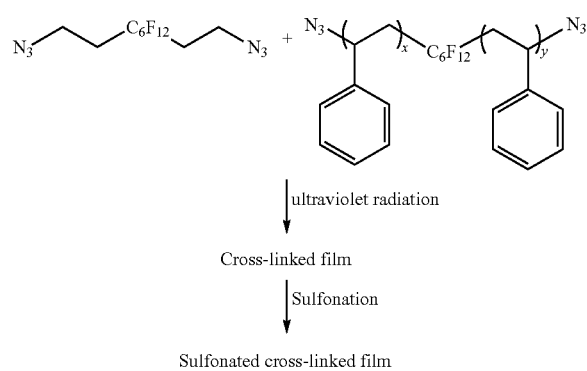

with x and y corresponding to the number of repeats of the unit between brackets.

This example comprises the following steps:
a preparation step of 1,10-diazido-1H,1H,2H,2H,9H,9H,10H,10H-perfluorodecane (called step b) below) involving the prior preparation of 1,10-diiodo-1H,1H,2H,2H,9H,9H,10H,10H-perfluorodecane (called step a) below);
a polymerisation step of the styrene via degenerative transfer of iodine (called step c) below);

an azidation step of the polymer obtained at step c) (called step d) below);

a photo-cross-linking step of the polymer obtained at step d) with the compound prepared at step b (called step e) below);

a sulfonation step of the polymer thus photo-cross-linked (called step f) below);

a determination step to determine water content and titrated ion exchange capacity (called step g) below).

Step a

Preparation of 1,10-diiodo-1H,1H,2H,2H,9H,9H, 10H,10H-perfluorodecane 1,10-diiodo-1H,1H,2H,2H,9H,9H,10H,10H perfluorodecane is prepared by bismonoaddition of α,ω-diiodoperfluorohexane on ethylene in a 160 mL Hastelloy HC276 autoclave as per the following reaction scheme:

The precise operating protocol is as follows.

The autoclave, before adding the reagents, is previously closed and tested at a pressure of 30 bars for 20 minutes, to detect any leaks. The autoclave is then degassed and placed under a vacuum of 2 mm of mercury for 15 minutes. Next, a polymerisation initiator (di-4-tert-butylcyclohexylperoxydicarbonate) (4.22 g, 10 mmol) and 30.13 g (54.2 mmol) of α,ω-diiodoperfluorohexane solubilised in tert-butanol (40 mL) are added via a cannula connected to an input valve of the autoclave.

The autoclave is then placed on scales and ethylene (3.0 g, 0.1 mol) is added. This is heated to 50° C. for 7 hours. An increase in pressure of 5 to 13 bars is observed followed by a slow decrease down to 5 bars. The autoclave is then cooled to ambient temperature and placed in an iced vessel.

After removing non-consumed ethylene, the autoclave is opened and the tert-butanol is evaporated. The product obtained is solubilised in 20 mL of tetrahydrofuran then precipitated in cold pentane. The precipitate is separated by filtration on sintered glass of porosity 4, then washed and dried at ambient temperature in vacuo (at 20 mm of mercury for 24 hours) to give a white powder (26 g) with a yield of 82%.

The $^{19}F$ NMR spectrum exhibits three singlets of integration 4 having the following chemical shifts: −115.2 ppm, −121.8 ppm and −123.8 ppm attributable to the fluorine atoms at positions α, β and γ of the ethylene repeat unit (these chemical shifts in other words corresponding to the fluorine atoms carried by the —$C_6F_{12}$— group). The singlet at position −60 ppm, characteristic of fluorine atoms at a of the iodine atoms of the $IC_6F_{12}I$ precursor, is not observed thereby indicating that this precursor has reacted quantitatively in accordance with the above-mentioned reaction scheme.

The $^1H$ NMR spectrum shows a multiplet at 2.8 ppm and a triplet at 3.2 ppm respectively attributed to the hydrogen atoms at positions α and β of the iodine atoms.

Step b

Preparation of 1,10-diazido-1H,1H,2H,2H,9H,9H, 10H,10H-perfluorodecane 1,10-diazido-1H,1H,2H,2H,9H,9H,10H,10H-perfluorodecane is prepared as per the following reaction scheme:

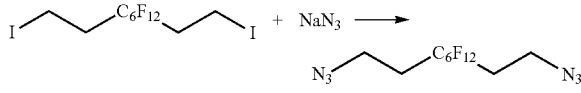

The precise operating protocol is as follows.

To a single-neck 100 mL flask are added 7.80 g (12.8 mmol) of 1,10-diiodo-1H,1H,2H,2H,9H,9H,10H,10H-perfluorodecane prepared in accordance with step a) and 2.21 g (30.8 mmol) of sodium azide and 35 mL of dimethylsulfoxide (DMSO). The flask is placed on a magnetic stirrer and heated to 50° for 48 hours. The reaction mixture is precipitated in 250 mL of water then dissolved in diethylether.

The organic phase is washed with water (50 mL) three times and dried over magnesium sulfate. The solvent is evaporated under reduced pressure to give 3.4 g of oil of pale green colour with a yield of 70%.

The $^{19}F$ NMR spectrum shows peaks at the following respective chemical shifts: −114.2 ppm, −121.8 ppm and −123.8 ppm corresponding to the fluorine atoms at positions α, β and γ of the ethylene groups located either side of the —$C_6F_{12}$— group.

The $^1H$ NMR spectrum shows a multiplet of integration 4 centred on 2.3 ppm owing to shielding, and a triplet of integration 4 centred on 3.6 ppm via deshielding respectively attributable to the protons of the —$CH_2$— groups located at α and β of the —$CF_2$— group positioned at the end of the —$C_6F_{12}$— group.

Analysis by infrared spectroscopy evidences the presence of azide functions through the presence of a band of strong intensity positioned at 2100 $cm^{-1}$. The characteristic band of the -CF— groups appears in a wavelength region of 1000 to 1250 $cm^{-1}$.

Step c

Radical Polymerisation of the Styrene Via Degenerative Transfer of Iodine

This step illustrates the polymerization of styrene via degenerative transfer of iodine involving the use of 1,6-diiodoperfluorohexane ($IC_6F_{12}I$) as per the following reaction scheme:

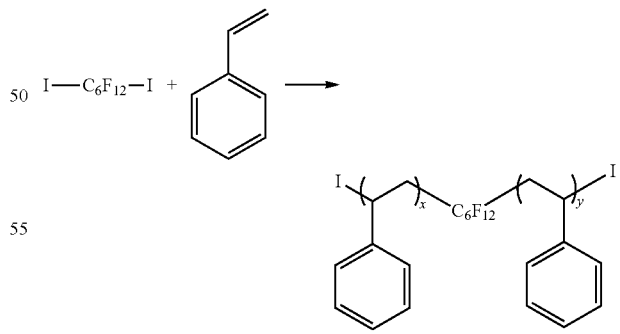

x and y corresponding to the number of repeats of the repeat units between brackets.

The precise operating protocol is the following.

To a Schlenk tube are added 0.0246 g (0.15 mmol) of α,α'-azobis(isobutyronitrile) (AiBN), 0.275 g (0.5 mmol) of 1,6-diiodoperfluorohexane ($IC_6F_{12}I$) and 25 g (48 mmol) of styrene. The system is degassed for 20 minutes by bubbling nitrogen, closed and brought to 70° C. for 24 hours. After the reaction, the reaction mixture is cooled to ambient temperature then solubilized in 20 mL of tetrahydrofuran (THF). The solution obtained is precipitated in 500 mL of diethyl ether. The precipitate is obtained by filtration through sintered glass of porosity 4 then dried in vacuo for 24 hours, after which a white powder is obtained (6 g), the yield being 27%.

Step d

Azidation of the Polymer Obtained at Step c)

This step can be summarized by the following reaction scheme.

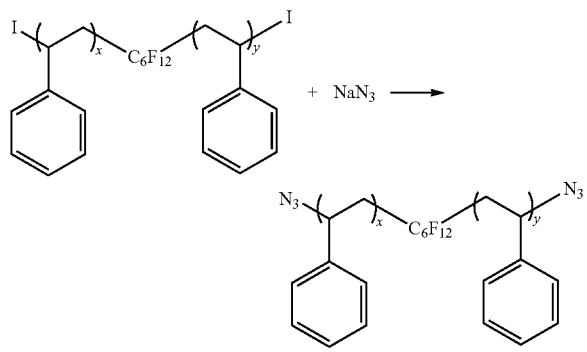

The precise operating protocol is the following.

To a 250 mL two-necked flask containing a magnetized bar and surmounted by a coolant are respectively added 6.7 g (0.13 mmol) of polymer obtained at step c), 0.2 g (3 mmol) of sodium azide ($NaN_3$) and 10 mL of dimethylformamide. The reaction mixture is stirred for 12 hours at 50° C. The solution obtained is precipitated in 500 mL of water. The precipitate is extracted by filtration through sintered glass of porosity 4. The product obtained is solubilised in 20 mL of tetrahydrofuran (THF) and dried over magnesium sulfate. The solvent is evaporated under reduced pressure. The product is in the form of a white powder (6.0 g), the yield being 87%.

Step e

Photo-Cross-Linking of the Polymer Prepared According to Example d) in the Presence of the Compound Prepared at Example b)

To a hemolysis tube are added 420.0 mg of the polymer obtained at step d), 343.64 mg of 1,10-diazido-1H,1H,2H, 2H,9H,9H,10H,10H-perfluorodecane obtained according to step b) and 2.0 mL of tetrahydrofuran (THF). The solution is stored away from light for 12 hours to obtain a limpid solution. This solution is then deposited on a glass plate measuring 2 cm² previously placed on a spin-coater (Apparatus CT60, Karl Suss Technique SA). The forming of the film is carried out at a speed of 3500 rpm reached in 15 seconds. The film having a thickness of 20 to 30 μm is dried in a thermostat-controlled oven at 60° C. for 6 hours and is then brought to 80° C. over a period of 12 hours.

Radiation uses a UV benchtop conveyor, Fusion LC6 model, at a rate of 2.5 m/min for 45 minutes, to generate photo-cross-linking.

Etape f

Sulfonation of the Cross-Linked Polymer Obtained at Step e)

The sulfonation step is conducted in a closed system containing 25 mL of 1,2-dichloroethane and 1 mL of chlorosulfonic acid. The cross-linked film prepared at step e) bonded to its glass substrate is immersed in this solution. Degassing by nitrogen bubbling is carried out for 20 minutes. After sulfonation, the membranes are immersed in solutions of ethanol to remove the residues of chlorosulfonic acid.

The degree of sulfonation (DOS) was defined from the following equation:

$$DOS = [(IEC_{experimental})/(IEC_{theoretical})] * 100$$

$IEC_{experimental}$ corresponding to the ion exchange capacity obtained from the percentage of sulfur determined by elementary analysis; and $IEC_{theoretical}$ corresponding to a theoretical ion exchange capacity calculated from the quantity of three-block copolymer (namely polystyrene-b-$C_6F_{12}$-b-polysterene) (of number average molecular weight Mn=50 000 g/mol) belonging to the network, on the principle that each cycle has a —$SO_3H$ group.

The $IEC_{theoretical}$ is therefore determined according to the following formula:

$$IEC_{theoretical} = [x*\text{weight \% of S in the copolymer for a sulfonation rate of } 100\%]/M_s$$

where:
x is the weight percentage of three-block copolymer relative to the additive $N_3$—$(CH_2)_2$—$C_6F_{12}$—$(CH_2)_2$—$N_3$, namely 60% in the case here;
$M_s$ is the molar mass of sulfur (i.e. 32.06 g/mol);
the weight % of S in the copolymer for a sulfonation rate of 100% is 17.4%,
which leads us to an $IEC_{theoretical}$ of 3.2 meq/g.

The $IEC_{experimental}$ is determined using the following formula:

$$CEI_{experimental} = \% S/M_S$$

% S corresponding to the weight percentage of sulfur in the copolymer determined by elementary analysis, which in our case was estimated at 11%;
$M_S$ corresponding to the molar mass of sulfur,
which leads us to an $IEC_{experimental}$ of 3.4 meq/g (±0.8 meq/g).

It is therefore possible, through the similarity of the values found between $IEC_{theoretical}$ and $IEC_{experimental}$, to infer that the yield of sulfonation is quantitative.

Step g

Determination of Water Content and Titrated Ion Exchange Capacity

Before determining the water content and titrated ion exchange capacity, the sulfonated membrane obtained after step f) is subjected to two stabilisation cycles in accordance with the following operating conditions:
immersion for 2 hours in 100 mL HCl solution at 0.1 mol/L;
immersion for 2 hours in 100 mL NaOH solution at 0.1 mol/L; and
rinsing in a 0.1 mol/L NaCl solution.

The measurements of water content are performed after immersion of the membrane thus treated in 250 mL NaOH solution at 0.1 mol/L.

They are determined using the following formula:

Water content=100*[(wet wt.−dry wt.)/wet wt.]

the wet weight in our case being estimated at 8150 mg and the dry weight (i.e. the weight after dehydration) being estimated at 814 mg, which leads us to a water content of 110%.

Measurement of titrated ion exchange capacity is performed using the following protocol:

Immersion of the sulfonated membrane for 1 hour in 250 mL of a 1N hydrochloric acid solution; then Immersion of the sulfonated membrane for 4 hours in 20 mL of a solution composed of 20 mL of 0.1 N NaOH solution and 230 mL of 0.1 mol/L NaCl solution, the resulting solution being called solution 1.

A solution, called solution 2, is prepared under the same conditions as solution 1, except that solution 2 is not intended to impregnate the membrane. Solution 2 is used as reference solution.

Assays are performed on 20 mL samples of solutions 1 and 2 using a 0.01 N hydrochloric acid solution. The exchange capacity is defined in relation to equivalent volumes $V_1$ and $V_2$ according to the following equation:

IEC=[($V_2$−$V_1$)*0.1]/$m_S$ ms corresponding to the molar mass of the sulfonated group, which leads us to a titrated IEC value of 3.6 meq/g.

The coherency can be stressed between the IEC values defined from elementary analyses and those determined experimentally by assay. This result evidences the remarkable accessibility of the protogenic groups inside the membrane.

In addition, the water content defined experimentally reaches an upper limit of more than 100%, which leads to the conclusion that the cross-linking rate is sufficient to control osmotic pressure within the membrane.

The invention claimed is:

1. A polymer comprising at least one polymeric chain of a first type, said polymeric chain comprising at least two blocks, the same or different, the said blocks comprising repeat units derived from polymerisation of styrene monomers, the said units comprising at least one phenyl pendant group carrying at least one —$SO_3R$ group, R being a hydrogen atom, an alkyl group or cationic counter-ion, the said two blocks being separated by a spacer group, the spacer group being a perfluorocarbon group.

2. The polymer according to claim 1, wherein the repeat units derived from the polymerisation of styrene monomers meet the following general formula (I):

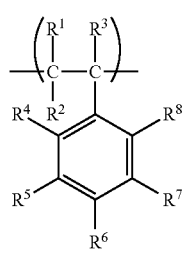

where $R^1$, $R^2$, $R^3$ independently of each other represent a hydrogen atom, an alkyl group, or a halogen atom and $R^4$, $R^5$, $R^6$, $R^7$ and $R^8$ independently of each other represent a hydrogen atom, an alkyl group, an aryl group, a —O-aryl group, a —O-alkyl group, an acyl group, an alkylaryl group, a halogen atom, or an —$SO_3R$ group, R being a hydrogen atom, an alkyl group or cationic counter-ion, the said alkyl, aryl, alkylaryl, —O-aryl, —O-alkyl groups optionally being perfluorinated and at least one of groups $R^4$, $R^5$, $R^6$, $R^7$ or $R^8$ being an —$SO_3R$ group, with R being a hydrogen atom, an alkyl group or cationic counter-ion.

3. The polymer according to claim 2, wherein $R^1$ to $R^3$ represent a hydrogen atom and one of $R^4$, $R^5$, $R^6$, $R^7$ or $R^8$ represents a —$SO_3R$ group, with R being a hydrogen atom, an alkyl group or cationic counter-ion, whilst the other groups represent a hydrogen atom.

4. The polymer according to claim 1, wherein the spacer group meets the following formula (II):

where n is an integer ranging from 1 to 30.

5. The polymer according to claim 2, comprising a chain of the first type comprising two blocks, the said blocks comprising repeat units of formula (I), the said blocks being separated by a perfluorocarbon spacer group meeting formula (II)

where n is an integer ranging from 1 to 30.

6. The polymer according to claim 1 which is a straight-chain polymer.

7. The polymer according to claim 6, which comprises two blocks, separated by a perfluorocarbon spacer group, the said polymer at its ends comprising terminal groups chosen from among an iodine atom and a —$N_3$ azido group.

8. The polymer according to claim 7, wherein the polymer is formed of two blocks comprising repeat units of formula (I)

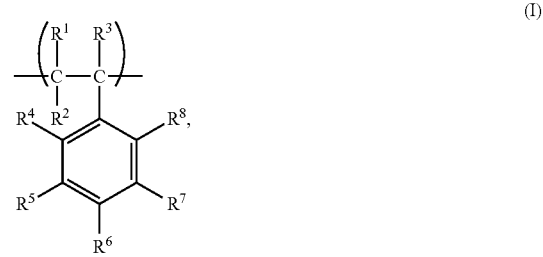

for which $R^1$ to $R^3$ are hydrogen atoms, one of $R^4$ to $R^8$ is an —$SO_3R$ group, with R being a hydrogen atom, an alkyl group or cationic counter-ion, whilst the other groups are hydrogen atoms, the said blocks being separated by a spacer group of formula (II)

with n equalling 6.

9. The polymer according to claim 1, which is a cross-linked polymer.

10. The polymer according to claim 9 which, in addition to one or more chains of the first type, also comprises one or more polymeric chains of a second type different from the first type, the said chains being linked together via cross-linking repeat units.

11. The polymer according to claim 10 wherein the cross-linking repeat units are azido repeat units of formula $N_3$.

12. The polymer according to claim 10 wherein the chain(s) of the second type comprise at least two blocks, the same or different, comprising repeat units derived from polymerisation of aliphatic ethylenic monomers, the said blocks being separated by a perfluorocarbon spacer group.

13. The polymer according to claim 12 wherein the repeat units derived from the polymerisation of aliphatic ethylenic monomers meet the following formula (VI):

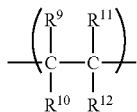
(VI)

where $R^9$, $R^{10}$, $R^{11}$ and $R^{12}$ independently of each other represent a hydrogen atom, an alkyl group, an aryl group, a —O-aryl group, a —O-alkyl group, an acyl group, an alkylaryl group, or a halogen atom.

14. The polymer according to claim 12 wherein the perfluorocarbon spacer group meets following formula (VII):

—(CF$_2$)$_m$— (VII)

where m corresponds to the number of repeats of the unit between brackets.

15. The polymer according to claim 13, wherein groups $R^9$ to $R^{12}$ represent a hydrogen atom.

16. The polymer according to claim 13, wherein the polymeric chain of the second type meets following formula (VIII):

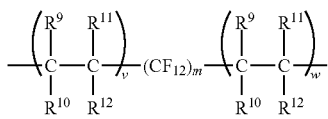
(VIII)

where $R^9$ to $R^{12}$ correspond to a hydrogen atom, v and w equal 1 whilst m equals 6.

17. The polymer according to claim 10, comprising one or more chains of the first type containing at least two blocks formed of repeat units meeting formula (I)

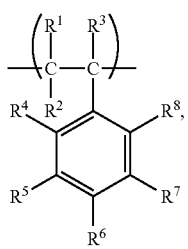
(I)

in which $R^1$ to $R^3$ are hydrogen atoms and one of groups $R^4$ to $R^8$ is a —SO$_3$H group whilst the other groups are hydrogen atoms, the said blocks being separated by a perfluorocarbon spacer group of formula (II)

—(CF$_2$)$_n$— (II), with n equaling 6, and comprising one or more chains of the second type comprising at least two blocks formed of repeat units of formula (VI)

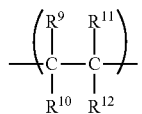
(VI)

in which $R^9$ to $R^{12}$ represent hydrogen atoms, the said blocks being separated by a spacer group of formula (VII)

—(CF$_2$)$_m$— (VII)

with m equalling 6, the said chains being linked together by cross-linking repeat units of formula —N$_3$—.

18. A method for preparing a polymer comprising at least one polymeric chain of a first type comprising at least two blocks, the same or different, the said blocks comprising repeat units derived from the polymerisation of styrene monomers, the said units comprising at least one phenyl pendant group carrying at least one —SO$_3$R group, R being a hydrogen atom, an alkyl group or cationic counter-ion, the said two blocks being separated by a spacer group, the said spacer group being a perfluorocarbon group, the said method comprising the following steps:
   a) a polymerisation step of at least one styrene monomer by degenerative transfer of iodine comprising the contacting of a transfer agent comprising a perfluorocarbon group having an iodine atom at its two ends, with a polymerisation initiator and at least one styrene monomer, after which a polymer is obtained comprising two blocks comprising repeat units derived from the polymerisation of the said styrene monomer(s), the said blocks being separated by a perfluorocarbon spacer group corresponding to the perfluorocarbon group of the transfer agent, the said polymer comprising an iodine atom at its ends;
   b) an optional substitution step of the iodine atoms positioned at the ends of the polymer obtained after step a) by —N$_3$ azido groups; and
   c) an optional sulfonation step of the polymer obtained at step a) or b) if the styrene monomer is devoid of any —SO$_3$R group, R being a hydrogen atom, an alkyl group or cationic counter-ion .

19. The method according to claim 18, wherein the transfer agent meets the following formula:

I—R$_f$—I where R$_f$ corresponds to the perfluorocarbon group.

20. The method according to claim 19, wherein R$_f$ meets formula —(CF$_2$)$_n$—with n being an integer ranging from 1 to 30.

21. The method according to claim 18, wherein the styrene monomer meets following formula (X):

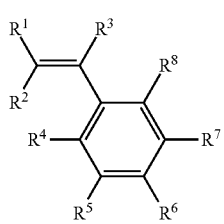
(X)

where $R^1$, $R^2$, $R^3$ independently of each other represent a hydrogen atom, an alkyl group, or a halogen atom and $R^4$, $R^5$, $R^6$, $R^7$ and $R^8$ independently of each other represent a hydrogen atom, an alkyl group, an aryl group, a —O-aryl group, a —O-alkyl group, an acyl group, an alkylaryl group, a halogen atom, or an —SO$_3$R group, R being a hydrogen atom, an alkyl group or cationic counter-ion, the said alkyl, aryl, alkylaryl, -aryl, -alkyl groups optionally being perfluorinated.

22. The method according to claim 18, wherein the sulfonation step consists of subjecting the polymer obtained after step a) or b) to the action of chlorosulfonic acid.

23. A method for preparing a polymer which, in addition to one or more polymeric chains of the first type comprising at least two blocks, the same or different, the said blocks comprising repeat units derived from the polymerisation of styrene monomers, the said units comprising at least one phenyl pendant group carrying at least one —SO$_3$R group, R being a hydrogen atom, an alkyl group or cationic counter-ion, the said two blocks being separated by a spacer group, the said spacer group being a perfluorocarbon group, comprises one or more chains of a second type comprising at least two blocks, the same or different, the said blocks comprising repeat units derived from the polymerisation of aliphatic ethylenic monomers separated by a perfluorocarbon spacer group, the said chains being linked together by cross-linking repeat units of formula —N$_3$ —, the said preparation method comprising the following steps:

d) a step to prepare a precursor telechelic polymer of said chains of the second type, the said telechelic polymer comprising at least two blocks, the same or different, the said blocks comprising repeat units derived from the polymerisation of aliphatic ethylenic monomers, these blocks being separated by a perfluorocarbon spacer group, the ends of this telechelic polymer consisting of an azido group;

e) a step to prepare a polymer comprising at least one polymeric chain of a first type comprising at least two blocks, the same or different, the said blocks comprising repeat units derived from the polymerisation of styrene monomers, the said units comprising at least one phenyl pendant group carrying at least one —SO$_3$R group, R being a hydrogen atom, an alkyl group or cationic counter-ion, the said two blocks being separated by a spacer group, the spacer group being a perfluorocarbon group, the said preparation step comprising the following successive operations:

a polymerisation operation of at least one styrene monomer by degenerative transfer of iodine comprising the contacting of a transfer agent, containing a perfluorocarbon group having an iodine atom at its two ends, with a polymerisation initiator and at least one styrene monomer, after which a polymer is obtained comprising two blocks comprising repeat units derived from the polymerisation of the said styrene monomer(s), the said blocks being separated by a perfluorocarbon spacer group corresponding to the perfluorocarbon group of the transfer agent, the said polymer comprising an iodine atom at its ends;

a substitution operation of the iodine atoms positioned at the ends of the polymer obtained at the above-mentioned polymerisation operation, substituted by —N$_3$ azido groups; and f) a cross-linking step of the polymer obtained after step e) in the presence of the telechelic polymer obtained after step d;

g) an optional sulfonation step of the polymer obtained at above-mentioned step f) if the styrene monomer(s) mentioned at step e) do not comprise any —SO$_3$R groups, with R being a hydrogen atom, an alkyl group or cationic counter-ion.

24. The method according to claim 23, wherein the repeat units derived from the polymerisation of aliphatic ethylenic monomers meet following formula (VI):

where $R^9$, $R^{10}$, $R^{11}$ and $R^{12}$ independently of each other represent a hydrogen atom, an alkyl group, an aryl group, a —O-aryl group, a —O-alkyl group, an acyl group, an alkylaryl group, or a halogen atom, the aliphatic ethylenic monomers meeting the following formula (XI):

25. The method according to claim 23, wherein the step to prepare the telechelic polymer comprises the following operations:

a polymerisation operation of at least one aliphatic ethylenic monomer in the presence of a transfer agent, consisting of a diiodine compound comprising iodine atoms at its two ends separated by a perfluorocarbon spacer group, and the presence of a polymerisation initiator after which a polymer is obtained comprising two blocks derived from the polymerisation of the said above-mentioned aliphatic ethylenic monomers, these blocks being separated by the said perfluorocarbon spacer group corresponding to the perfluorocarbon spacer group of the transfer agent, and the said polymer comprising two iodine atoms at its ends;

a substitution operation of the iodine atoms at the ends of the polymer by —N$_3$ azido groups.

26. A membrane comprising a polymer defined according to claim 1.

27. A fuel cell device comprising at least one cell comprising a membrane as defined in claim 26 arranged between two electrodes.

28. The polymer according to claim 14, wherein m equals 6.

* * * * *

UNITED STATES PATENT AND TRADEMARK OFFICE
CERTIFICATE OF CORRECTION

PATENT NO. : 9,184,459 B2  
APPLICATION NO. : 13/823991  
DATED : November 10, 2015  
INVENTOR(S) : Pierrick Buvat et al.

Page 1 of 1

It is certified that error appears in the above-identified patent and that said Letters Patent is hereby corrected as shown below:

Title Page, Item 73: "UNIVERSITE MONTPELLIER 2, SCIENCES ET TECHNIQUES, Montpellier (FR)" should be -- UNIVERSITE MONTPELLIER 2, SCIENCES ET TECHNIQUES, MONTPELLIER CEDEX 5, FRANCE --.

Title Page, Item 73: "ECOLE NATIONALE SUPERIEURE DE CHIMIE DE MONTPELLIER, Montpellier (FR)" should be -- ECOLE NATIONALE SUPERIEURE DE CHIMIE DE MONTPELLIER, MONTPELLIER CEDEX 5, FRANCE --.

In the Specification,

Column 1, below the corrected application title, NOVEL SULFONATED POLYMERS USEFUL FOR FORMING FUEL CELL MEMBRANES, and before the heading TECHNICAL FIELD, please insert the following heading and paragraph:

-- CROSS-REFERENCE TO RELATED APPLICATIONS
This application is a U.S. national phase under the provisions of 35 U.S.C. § 371 of International Patent Application No. PCT/EP11/66402 filed September 21, 2011, which in turn claims priority of French Patent Application No. 1057668 filed September 23, 2010. The disclosures of such international patent application and French priority patent application are hereby incorporated herein by reference in their respective entireties, for all purposes. --.

Signed and Sealed this  
Seventeenth Day of May, 2016

Michelle K. Lee  
*Director of the United States Patent and Trademark Office*